(12) United States Patent
Snyder

(10) Patent No.: US 6,471,902 B1
(45) Date of Patent: Oct. 29, 2002

(54) MULTI-POINT COMPRESSION MOLDING PROCESS

(75) Inventor: Matthew Snyder, Tokyo (JP)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/471,079

(22) Filed: Dec. 23, 1999

(30) Foreign Application Priority Data

Dec. 25, 1998 (JP) .............................. 10-371573

(51) Int. Cl.[7] .................. B29C 33/10; B29C 43/02; B29C 45/00; B29C 45/34
(52) U.S. Cl. ...................... 264/294; 264/319; 264/328.7
(58) Field of Search .................................. 264/294, 319, 264/328.7

(56) References Cited

U.S. PATENT DOCUMENTS

| 5,149,479 A | 9/1992 | Nakajima |
| 5,476,629 A | 12/1995 | Yabe et al. |

FOREIGN PATENT DOCUMENTS

| EP | 0755767 A1 | 1/1997 |
| GB | 2009910 A | 6/1979 |
| JP | 03284920 | 12/1991 |
| JP | 04356243 | 12/1992 |
| JP | 06105472 | 4/1994 |

*Primary Examiner*—Leo B. Tentoni
(74) *Attorney, Agent, or Firm*—Antonelli, Terry, Stout & Kraus, LLP.

(57) ABSTRACT

A multi-point thin portion compression molding method and apparatus in which a plurality of ultra thin portions can be formed by compression molding. Mold apparatuses are opened/close to each other to form a cavity space having a molded material therebetween, at least one movable telescopic member passes through one metal mold and protrudes toward the other metal mold, the central and outer periphery of the telescopic member are provided with vent portions, and recess portions are formed on the metal mold contacting the vent portions to allow molten resin to escape, and the recess portions adjust a pressure applied to the cavity space by the compressing operation of the telescopic member.

3 Claims, 12 Drawing Sheets

FIG. 8

| PRESS POSITION | | 1 | 2 | 3 | 4 | 5 | AVERAGE VALUE | MAXIMUM VALUE | MINIMUM VALUE |
|---|---|---|---|---|---|---|---|---|---|
| 13.6 | THICKNESS | 0.250 | 0.246 | 0.250 | 0.245 | 0.244 | 0.247 | 0.250 | 0.244 |
|  | BULGE | 0.05 | 0.05 | 0.05 | 0.05 | 0.05 | 0.05 | 0.05 | 0.05 |
| 14.6 | THICKNESS | 0.221 | 0.210 | 0.207 | 0.209 | 0.211 | 0.212 | 0.221 | 0.207 |
|  | BULGE | 0.10 | 0.10 | 0.05 | 0.05 | 0.10 | 0.08 | 0.10 | 0.05 |
| 14.8 | THICKNESS | 0.191 | 0.195 | 0.191 | 0.196 | 0.194 | 0.193 | 0.196 | 0.191 |
|  | BULGE | 0.10 | 0.15 | 0.10 | 0.10 | 0.15 | 0.12 | 0.15 | 0.10 |
| 15.6 | THICKNESS | 0.180 | 0.176 | 0.176 | 0.176 | 0.156 | 0.173 | 0.180 | 0.156 |
|  | BULGE | 0.15 | 0.15 | 0.15 | 0.15 | 0.15 | 0.15 | 0.15 | 0.15 |
| 16.6 | THICKNESS | 0.158 | 0.160 | 0.154 | 0.142 | 0.154 | 0.154 | 0.160 | 0.142 |
|  | BULGE | 0.35 | 0.40 | 0.35 | 0.35 | 0.40 | 0.37 | 0.40 | 0.35 |
| 17.6 | THICKNESS | 0.144 | 0.145 | 0.145 | 0.145 | 0.141 | 0.144 | 0.145 | 0.141 |
|  | BULGE | 0.40 | 0.40 | 0.40 | 0.35 | 0.40 | 0.39 | 0.40 | 0.35 |

FIG. 9
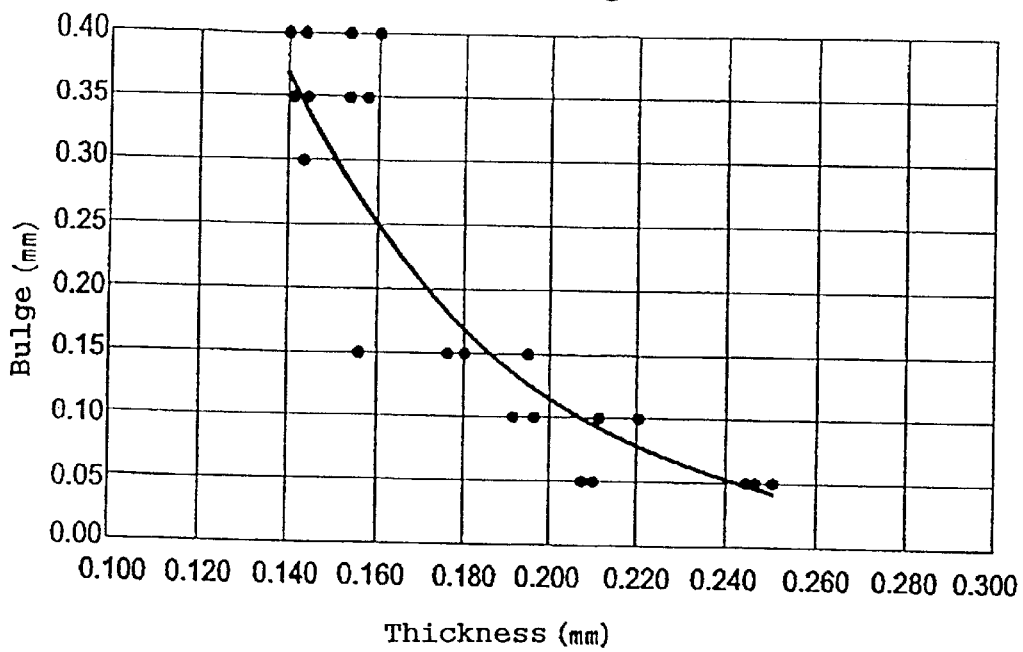
FIG. 10
| CONDITION 1: PRESS POSITION (13.6mm) | | | | | AVERAGE VALUE | MAXIMUM VALUE | MINIMUM VALUE |
|---|---|---|---|---|---|---|---|
| | 1 | 2 | 3 | 4 | 5 | | | |
| PART A | 0.250 | 0.246 | 0.250 | 0.245 | 0.244 | 0.247 | 0.250 | 0.244 |
| PART B | 0.282 | 0.270 | 0.280 | 0.281 | 0.280 | 0.279 | 0.282 | 0.270 |
| PART C | 0.225 | 0.233 | 0.241 | 0.237 | 0.226 | 0.232 | 0.241 | 0.225 |
| PART D | 0.212 | 0.217 | 0.237 | 0.219 | 0.220 | 0.221 | 0.237 | 0.212 |
FIG. 11
(PRIOR ART)
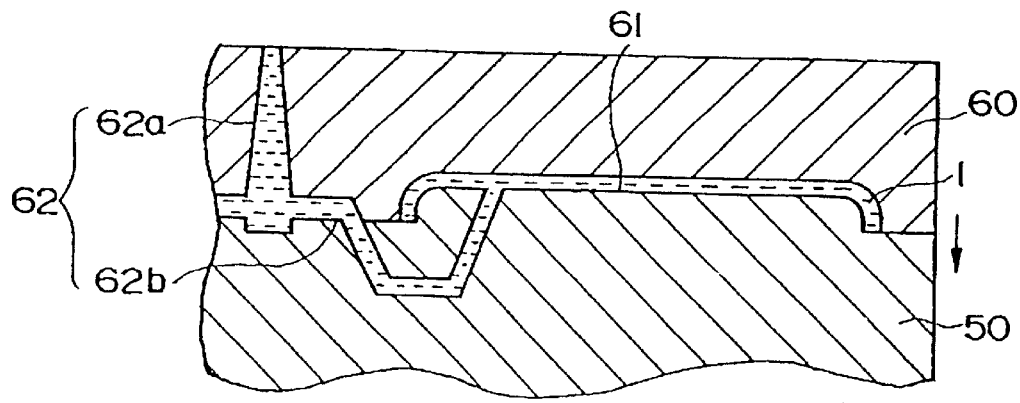

MULTI-POINT COMPRESSION MOLDING PROCESS

REFERENCE OF RELATED APPLICATION

This application claims the Paris Convention priority right of Japanese Patent Application No. Hei 10-371573 filed on Dec. 25, 1998, the entire disclosure of which is incorporated by reference.

BACKGROUND OF THE INVENTION (i) Field of the Invention

The present invention relates to a multi-point thin portion compression molding method and a multi-point thin portion compression mold for use in this method, particularly to a multi-point thin portion compression molding method of filling a metal mold with molten resin and pressurizing and compressing a molded material by a movable telescopic member in a cavity to form a plurality of thin portions and a multi-point thin portion compression mold for use in this method.

(ii) Description of the Related Art

In a conventional art, a case formed by an injection molding technique is frequently used in the exterior member of an electronic apparatus. For this electronic apparatus case, in recent years, there has been a demand for reduction in size for carrying and other use purposes. Moreover, for the electronic apparatus case, there are demands for the integration of a circuit substrate and the thinning of the case in order that the increasing number of electronic components with various additional functions are efficiently contained inside. Particularly, for example, in mobile communication terminals such as a PHS phone and a cellular phone, the reduction in size for carrying and the thinning of the case for efficiently containing the increasing number of internal components with various additional functions are most important. FIG. 11 is a sectional view showing a conventional injection mold for forming such case. Moreover, FIG. 12 is a perspective view of a case 70 of a cellular phone formed by the injection mold shown in FIG. 11. Furthermore, FIG. 13 is a sectional view of a section taken along line I—I shown in FIG. 12.

As shown in FIG. 11, the conventional injection mold is constituted of a pair of a fixed metal mold 60 and a movable metal mold 50 which are opened/closed, and attached to a predetermined mold opening/closing apparatus (not shown) and driven. Here, the movable metal mold 50 is movable in an arrow direction shown in FIG. 11, and attached to or detached from the fixed metal mold 60. Moreover, a cavity space 61 having a molded material shape is formed between the fixed metal mold 60 and the movable metal mold 50 when the mold is closed. This cavity space 61 is connected to a gate 62 via which molten resin 1 is supplied from the outside of the fixed metal mold 60, and this gate 62 is provided with a spool 62a and a runner 62b which are formed in the fixed metal mold 60 and the movable metal mold 50, respectively. In the injection mold shown in FIG. 11, the gate 62 is formed in a submarine gate (tunnel gate) shape.

To form the molded material by the conventional injection mold formed as described above, the movable metal mold 50 is placed in contact with the fixed metal mold 60 to close the mold, the movable metal mold 50 is pressed onto the fixed metal mold 60 to clamp the mold, then the cavity space 61 is filled with the molten resin 1, and the molten resin 1 is cooled to form the molded material. Subsequently, the movable metal mold 50 is detached from the fixed metal mold 60 to open the mold, and an ejector pin (not shown) is allowed to protrude from the movable metal mold 50 so that the molded material can be taken out.

The cellular phone case 70 formed by the above-described conventional injection mold will next be described in detail with reference to FIG. 12. As shown in FIG. 12, the cellular phone case 70 formed by the conventional injection mold is provided with a circuit substrate 80 with a plurality of electronic components 82 mounted thereon to form a high frequency circuit section. In this case, when the circuit substrate 80 is attached inside the case 70, the high frequency circuit section is requested to be shielded. Therefore, in the case 70, a shield wall 76 for closing and shielding the high frequency circuit section is formed.

Here, the circuit substrate 80 with the electronic components 82 higher than the shield wall 76 mounted thereon is attached to the case 70, and recessed thin portions 72 are formed so that the high electronic components 82 can be contained inside the shield wall 76. The recessed thin portions 72 can be formed by disposing protrusions in the cavity space 61 of the movable metal mold 50 shown in FIG. 11. Since the case 70 is provided with the thin portions 72 in this manner, an interval J between the surface of the circuit substrate 80 and the outer surface of the case 70 shown in FIG. 13 can be formed to be thin, thereby thinning the entire cellular phone case.

However, in the conventional injection molding method, there are design restrictions determined by the resin property and metal mold. For example, with a large thickness, hardening requires much time and disadvantages such as sink marks are generated. On the other hand, with a small thickness the molten resin fails to flow in the terminal end of the injection molded material. The thickness of the generally used injection molded material is in a range of about 0.8 mm to 1.5 mm at standard. Moreover, in the design of the injection molded material, considerations are required so that the thickness of the injection molded material is as uniform as possible. Particularly, in the injection molding, when the cavity space is filled with the molten resin, the surface of the resin flowing along the wall surface of the cavity space is quickly cooled and hardened, and so-called skin layers 1a are formed as shown in FIG. 13. The flow of the molten resin is further deteriorated by the skin layers 1a in the thin portions 72 shown in FIG. 13.

Therefore, in the case 70 shown in FIG. 12, since the thickness of the thin portion 72 is not uniform, the flow of the molten resin supplied via the gate 62 is deteriorated. This causes the insufficient filling of the case 70, and welds 70a by the resin flow in the thin portions 72 shown in FIG. 12. Moreover, in the usual injection molding, since the injection molded material is cooled as it is without being pressurized during the cooling process, the sink marks are generated on the surface of the molded material because of a difference of shrinkage factor between the thin portion compressed during the cooling process and the usual thick portion.

There is a compression molding method as a method for solving the above-described disadvantages. This compression molding method, in which the resin in the cavity is pressurized during the cooling process, has been noted in recent years as a technique of filling the inside of the metal mold with the resin and subsequently moving a movable telescopic member to compress the resin so that the sink marks are locally controlled or the opening and thin portions can be formed without any welds. Such prior art is disclosed, for example, in Japanese Patent Application Laid-Open No. 230534/1998. FIG. 14 is a sectional view showing such conventional compression mold. Moreover, FIG. 15 is an operation explanatory view showing an operation of forming the molded material by the compression mold shown in FIG. 14, FIG. 15A shows the filled state with the molten resin, FIG. 15B shows that the molten resin is compressed by the movable telescopic member, and FIG. 15C shows that the inside of the cavity is filled by the movable telescopic member. Moreover, FIG. 16 is a perspective view showing an IC card formed by the compression mold shown in FIG. 14.

As shown in FIG. 14, the conventional compression mold is constituted of a pair of a fixed metal mold 100 and a movable metal mold 90 which are opened/closed, and attached to a predetermined mold opening/closing apparatus (not shown) and driven. Here, the movable metal mold 90 is movable in an arrow direction shown in FIG. 14, disposed to be attached to or detached from the fixed metal mold 100, and further provided with a movable telescopic member 92 passed through the inside and movable in the arrow direction shown in FIG. 14. Since there is a high possibility that the molten resin 1 enters between the movable telescopic member 92 and the movable metal mold 90 during the compression by the movable telescopic member 92, burrs are generated on the molded material. Therefore, engagement is most important in the interval between the movable telescopic member 92 and the movable metal mold 90. The engagement between the movable telescopic member 92 and the movable metal mold 90 is usually preferably set in a range of $5\mu$ to $4\mu$. Moreover, a cavity space 99 having a molded material shape is formed inside between the fixed metal mold 100 and the movable metal mold 90 when the mold is closed. The cavity space 99 is provided with a gate 102 via which the molten resin 1 is supplied from the outside of the fixed metal mold 100.

When the molded material is formed by the conventional compression mold formed as described above, the movable metal mold 90 is placed in contact with the fixed metal mold 100 to close the mold, and the mold is clamped by pressing the movable metal mold 90 onto the fixed metal mold 100. Subsequently, as shown in FIG. 15A, the cavity space 99 is filled with the molten resin 1. In this case, as shown in FIG. 15B, the compression of the movable telescopic member 92 is started in the arrow direction shown in FIG. 15B while the cavity space 99 is sufficiently filled with the molten resin 1. Thereby, the molten resin 1 is supplied toward an unfilled portion 99a shown in FIG. 15B by the compression pressure of the movable telescopic member 92, and the inside of the cavity space 99 is entirely filled by the compression of the movable telescopic member 92 to a predetermined position as shown in FIG. 15C. As described above, since the conventional compression molding method comprises moving either the whole or a part of the metal mold by a compression molding apparatus mechanism or a separate mechanism and pressurizing the resin in the cavity, the defective phenomena such as the sink marks and welds of the molded material because of the volume decrease of the molten resin are eliminated.

As the molded material formed by the above-described conventional compression mold, for example, there is a main body 112 of an IC card 110 shown in FIG. 16. The main body 112 of the IC card 110 is formed in a thin rectangular flat plate shape, a flat surface is formed on one surface, and a recess portion 112a is formed on the other surface by compression by the movable telescopic member 92 in the above-described cavity of the compression mold. Moreover, the main body 112 is about 1.2 mm thick in the flat rectangular shape, and the ultra thin portion compressed by the movable telescopic member 92 on the bottom surface of the recess portion 112a is about 0.16 mm. Then, the IC card 110 is formed by housing an IC module 114 in the recess portion 112a of the main body 112. Therefore, since this main body 112 is formed by the conventional compression mold, the recess portion 112a can steadily be formed without any defective phenomena such as sink marks and welds.

However, in the conventional compression mold, it is difficult to dispose a plurality of recess portions 112a shown in FIG. 16, and the molding conditions such as a compression stroke, injection pressure, injection speed, metal mold temperature and pressure adjustment inside the metal mold are complicated in the application to the molded material provided with a complicated shape, for example, like the cellular phone case shown in FIG. 12. Moreover, for the cellular phone case, by the demand for the thinning of the case as described above, the molded material is formed in the thin portion having a thickness of 0.4 to 0.6 mm, and further the ultra thin portion having a thickness of 0.1 to 0.25 mm has to be formed by the compression by the compression mold.

As described above, in the conventional injection molding and compression molding methods, there is a disadvantage that it is difficult to provide the thin portion with a thickness of 0.4 to 0.6 mm and to further form a plurality of ultra thin portions with a thickness of 0.1 to 0.25 mm compressed by the compression molding on the case.

Moreover, since it is difficult to form a plurality of ultra thin portions by further compressing the thin portions, it is difficult to manufacture the portable case of the electronic apparatus reduced in weight and thickness. Additionally, when a plurality of ultra thin portions are formed by the conventional metal mold, the metal mold manufacture cost is disadvantageously increased.

SUMMARY OF THE INVENTION

The present invention has been developed to solve the above-described problems, and an object thereof is to provide a multi-point thin portion compression molding method and a multi-point thin portion compression mold for use in this method in which a plurality of ultra thin portions can steadily be formed by compression molding.

To achieve the above-described object, according to the present invention, there is provided a multi-point thin portion compression molding method which comprises disposing a pair of metal mold apparatuses opened/closed to each other to form a cavity having a molded material shape therebetween when a mold is closed, disposing at least one movable telescopic member on one opened/closed movable metal mold of the metal mold apparatuses for protruding toward the other fixed metal mold in the cavity by a metal mold mechanism or a separate mechanism, forming a recess portion for a rib on the movable metal mold for surrounding the periphery or a part of this movable telescopic member, closing the movable metal mold and the fixed metal mold, filling the cavity other than the recess portion with molten resin, subsequently allowing the movable telescopic member of the movable metal mold to protrude, compressing the molten resin in the cavity, allowing the molten resin to escape to the recess portion, and adjusting pressure applied to the inside of the metal mold so that at least one ultra thin portion is formed on a molded material by stable compression.

Here, the thickness of the molded material is formed to be a thin thickness in a range of 0.4 to 0.6 mm, and the thickness of the ultra thin portion of the molded material is formed to be a film-like ultra thin thickness in a range of 0.1 to 0.25 mm by compression of the movable telescopic member. Moreover, the movable metal mold and the movable telescopic member are preferably breathed by disposing a vent portion having a gap of $15\mu$ to $20\mu$ on both or either one of the center and the periphery of the movable telescopic member. Furthermore, the recess portion is preferably provided with a burr preventive portion to prevent burrs from being generated by the gap of the vent portion. Additionally, it is preferable to employ the molded material in cases of electronic apparatuses reduced in size such as a PHS phone and a cellular phone.

According to another aspect of the present invention, there is provided a multi-point thin portion compression mold for use in the multi-point thin portion compression molding method, which comprises a pair of metal mold apparatuses opened/closed to each other to form a cavity having a molded material shape therebetween when a mold is closed, at least one movable telescopic member disposed on one opened/closed movable metal mold of the metal mold apparatuses for protruding toward the other fixed metal mold inside the cavity by a metal mold mechanism or a separate mechanism, and a recess portion for a rib formed on the movable metal mold for surrounding the periphery or a part of the movable telescopic member.

Here, the thickness of the molded material is formed to be a thin thickness in a range of 0.4 to 0.6 mm, and the thickness of an ultra thin portion of the molded material is preferably compressed and formed to be a film-like ultra thin thickness in a range of 0.1 to 0.25 mm by moving the movable telescopic member. Moreover, the movable metal mold and the movable telescopic member are preferably provided with a vent portion having a gap of $15\,\mu$ to $2\mu$ for discharging gas to both or either one of the center and the periphery of the movable telescopic member. Furthermore, the recess portion is preferably provided with a burr preventive portion to prevent burrs from being generated by the gap of the vent portion. Additionally, it is preferable to employ the molded material in the cases of the electronic apparatuses reduced in size such as the PHS phone and the cellular phone.

BRIEF DESCRIPTION OF THE DRAWINGS

FIG. 8 is a table showing the measured numeric values of the thickness and bulge of the ultra thin portion positioned far from a gate shown in FIG. 2.

FIG. 9 is a graph showing a relation between the thickness and the bulge of the table shown in FIG. 8.

FIG. 10 is a table showing the measured value of each thickness of a plurality of ultra thin portions shown in FIG. 2 when they are formed in a press position of 13.6 mm.

FIG. 11 is a sectional view showing a conventional injection mold.

DETAILED DESCRIPTION OF THE PREFERRED EMBODIMENTS

Figure 1:
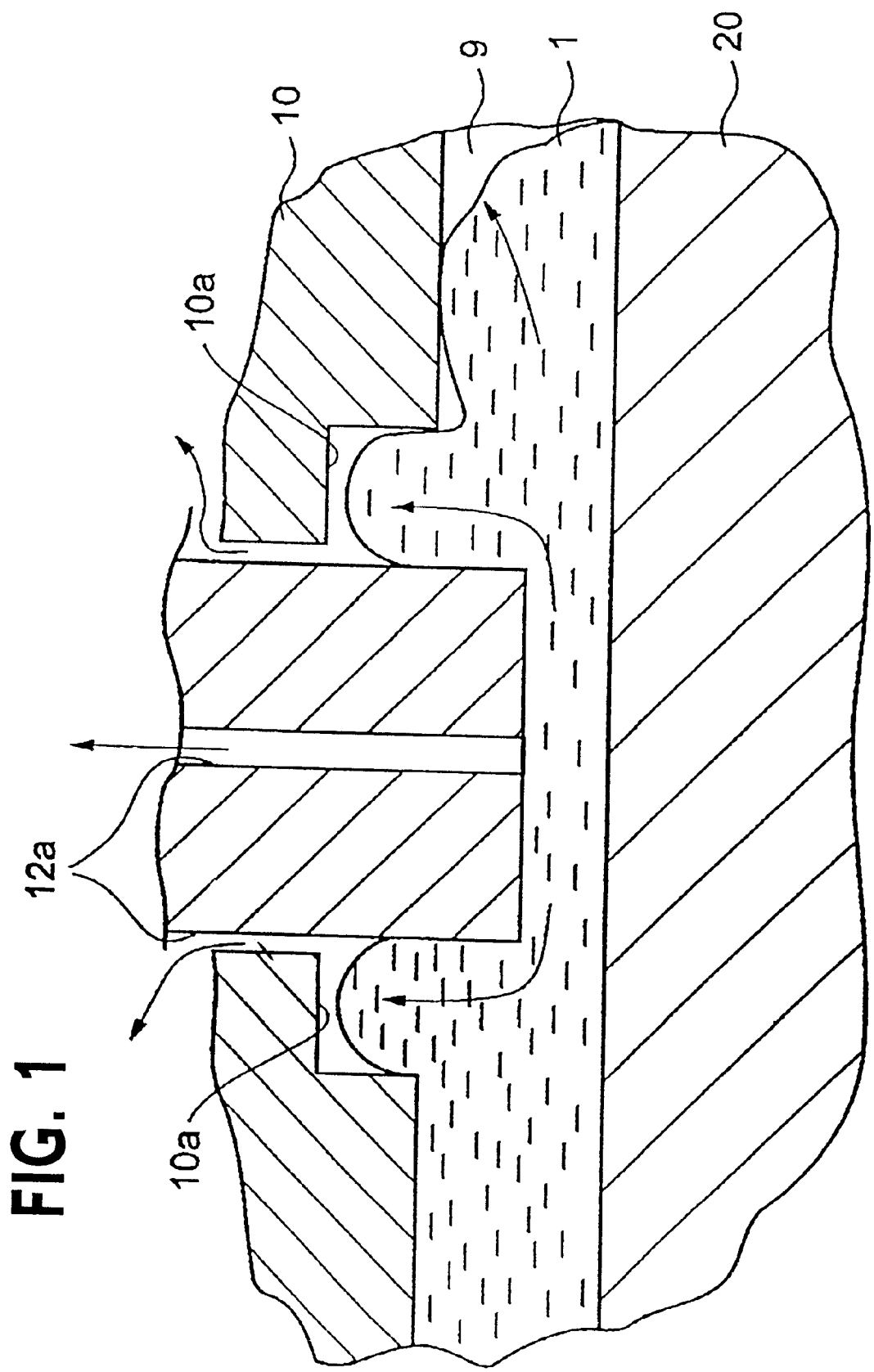
FIG. 1 is a sectional view showing an embodiment of a multi-point thin portion compression mold according to the present invention.
Figure 2:
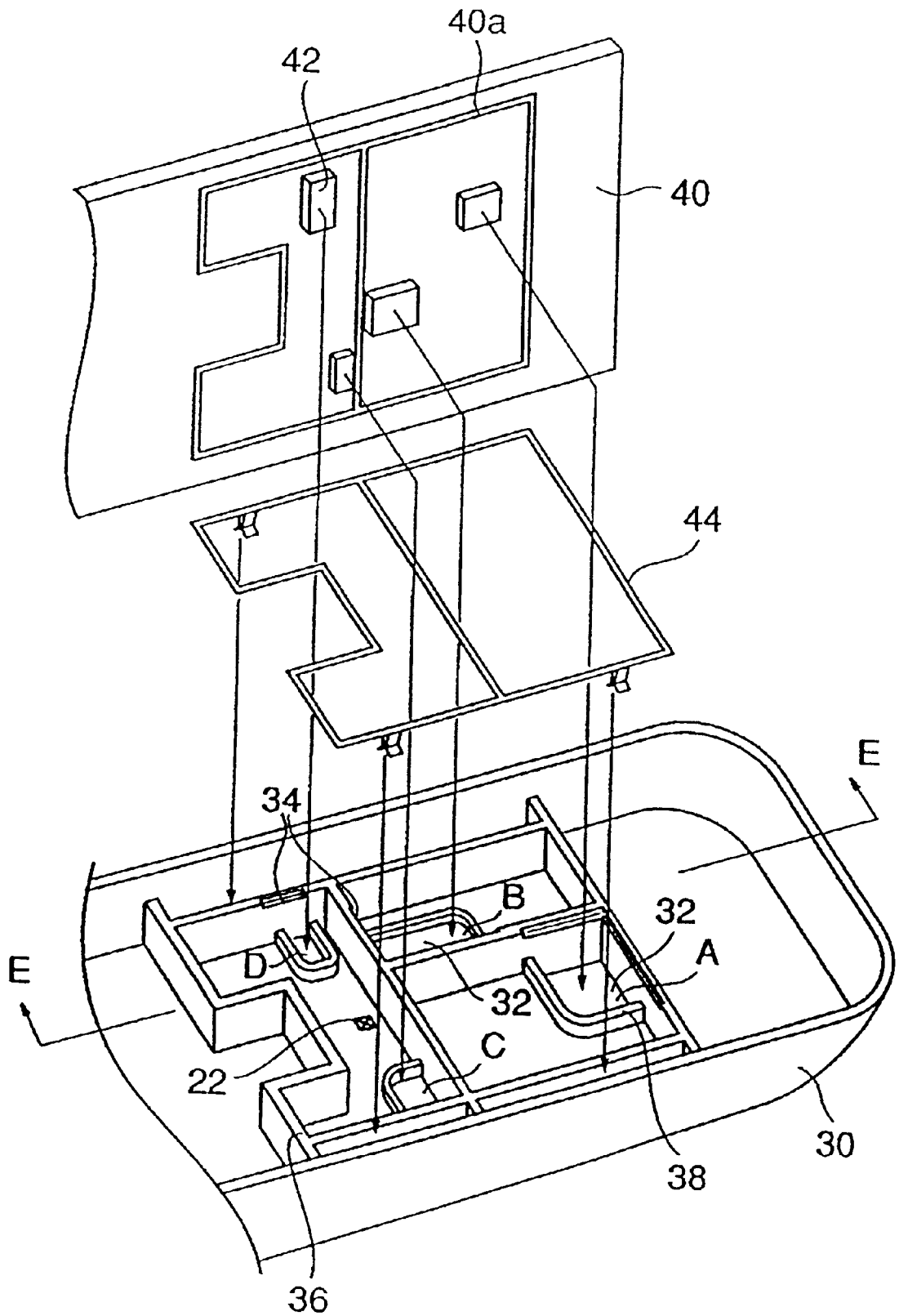
FIG. 2 is a perspective view showing a cellular phone case formed by the multi-point thin portion compression mold shown in FIG. 1.
Figure 3:
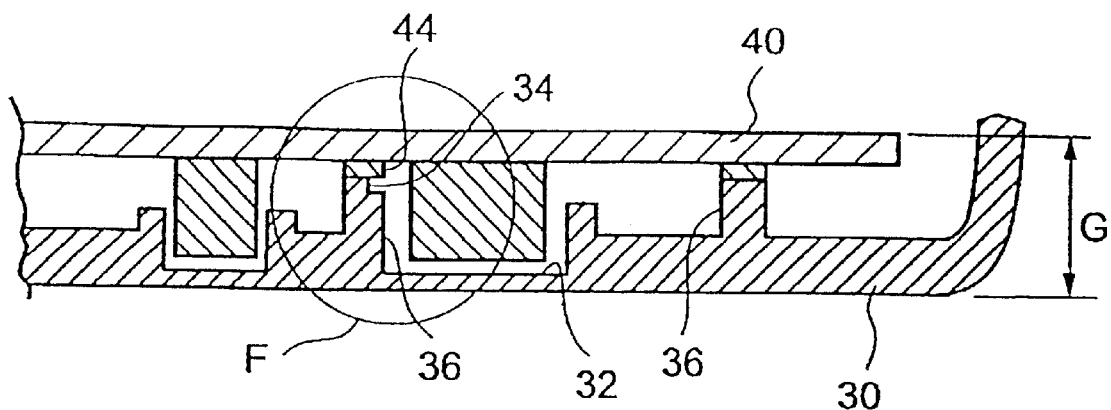
FIG. 3 is a sectional view showing a-section taken along line E—E shown in FIG. 2.
Figure 4:
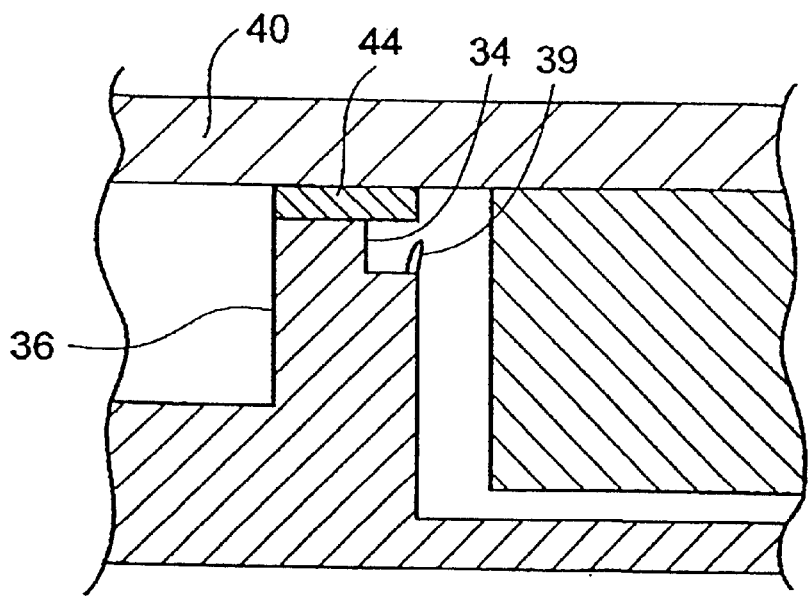
FIG. 4 is an enlarged view showing the detail of part F shown in FIG. 3.
Figure 5A:
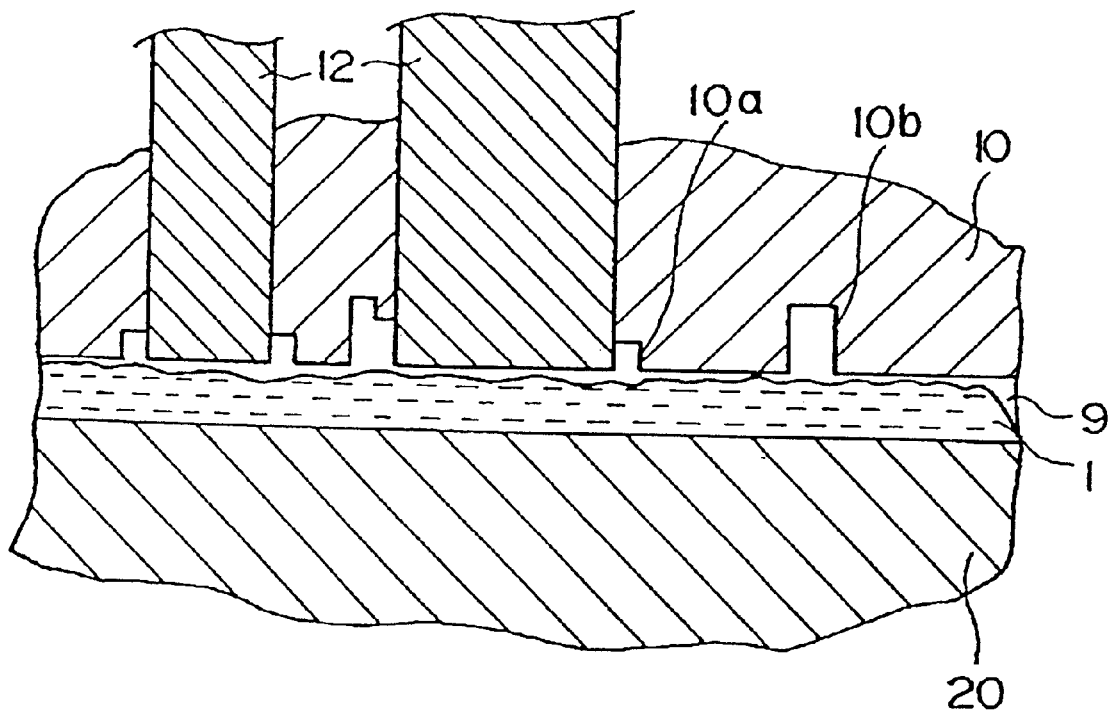
FIGS. 5A and 5B are sectional views showing the operation of a metal mold for forming the case shown in FIG. 3.
Figure 5B:
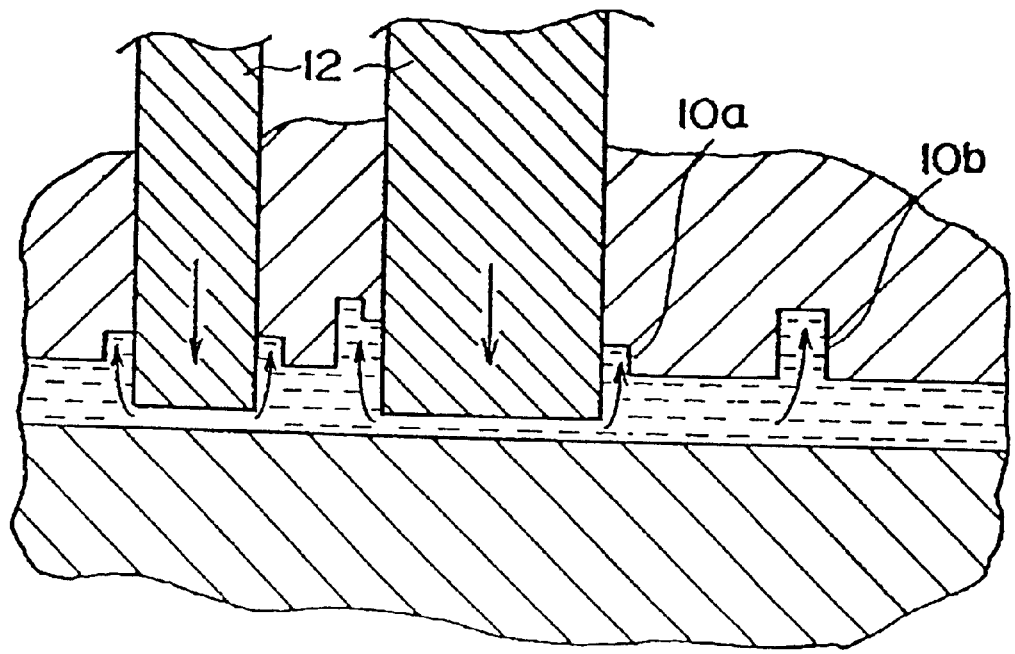

The embodiment of a multi-point thin portion compression molding method and a multi-point thin portion compression mold for use in this method according to the present invention will next be described in detail with a reference to the accompanying drawings. FIG. 1 is a sectional view showing the embodiment of the multi-point thin portion compression mold according to the present invention. Moreover, FIG. 2 is a perspective view showing a cellular phone case formed by the multi-point thin portion compression mold shown in FIG. 1. Furthermore, FIG. 3 is a sectional view showing a section taken along line EE shown in FIG. 2. Additionally. FIG. 4 is an enlarged view showing the detail of part F shown in FIG. 3. Moreover, FIGS. 5A and 5B are sectional views showing the operation of a metal mold for forming the case shown in FIG. 3, FIG. 5A shows the filling state of molten resin, and FIG. 5B shows the compressed state by a movable telescopic member.

As shown in FIG. 1, the multi-point thin portion compression mold of the present invention is constituted of a pair of a fixed metal mold 20 and a movable metal mold 10 to be opened/closed, the fixed metal mold 20 is fixed to a predetermined mold opening/closing apparatus (not shown), and the movable metal mold 10 is attached to/detached from the fixed metal mold 20 and driven. Moreover, a cavity space 9 having a molded material shape is formed in the fixed metal mold 20 and the movable metal mold 10 to form a molded material by molten resin 1 supplied to the inside when the molds are closed. This cavity space 9 is provided with a gate (not shown) for supplying the molten resin 1 from the outside of the fixed metal mold 20.

Moreover, the movable metal mold 10 is provided with a movable telescopic member 12 disposed to pass through the inside and protrude into the cavity. A plurality of movable telescopic members 12 are disposed in the movable metal mold 10, but this is not shown. Furthermore, the movable telescopic member 12 is provided with vent portions 12a opened in an outer peripheral portion which abuts on the movable metal mold 10 and a central portion. It is preferable to form a gap of about $15\mu$ to $20\mu$ in this vent portion 12a. However, since there is a high possibility that the molten resin 1 compressed by the movable telescopic member 12 enters the gap of the vent portion 12a as described above in the related art, burrs are generated on the molded material. Therefore, a burr preventive portion for avoiding disadvantages caused by the generated burrs is formed in the multi-point thin portion compression mold of the present invention. This burr preventive portion will be described later. Moreover, the movable metal mold 10 is provided with recess portions 10a via which the molten resin 1 is driven by the movable telescopic member 12 to flow along the surrounding cavity faces.

A cellular phone case 30 formed by the multi-point thin portion compression mold of the present invention will next be described with reference to FIG. 2. As shown in FIG. 2, a circuit substrate 40 with a plurality of electronic components 42 mounted thereon to form a high frequency circuit section is attached to the cellular phone case 30 formed by the multi-point thin portion compression mold of the present invention in the same manner as the prior-art case 70 shown in FIG. 12. In this case, the high frequency circuit section is disposed so that it can be closed and shielded when housed inside the case 30. Therefore, a shield wall 36 for closing and shielding the high frequency circuit section is integrally formed on the case 30.

Figure 12:
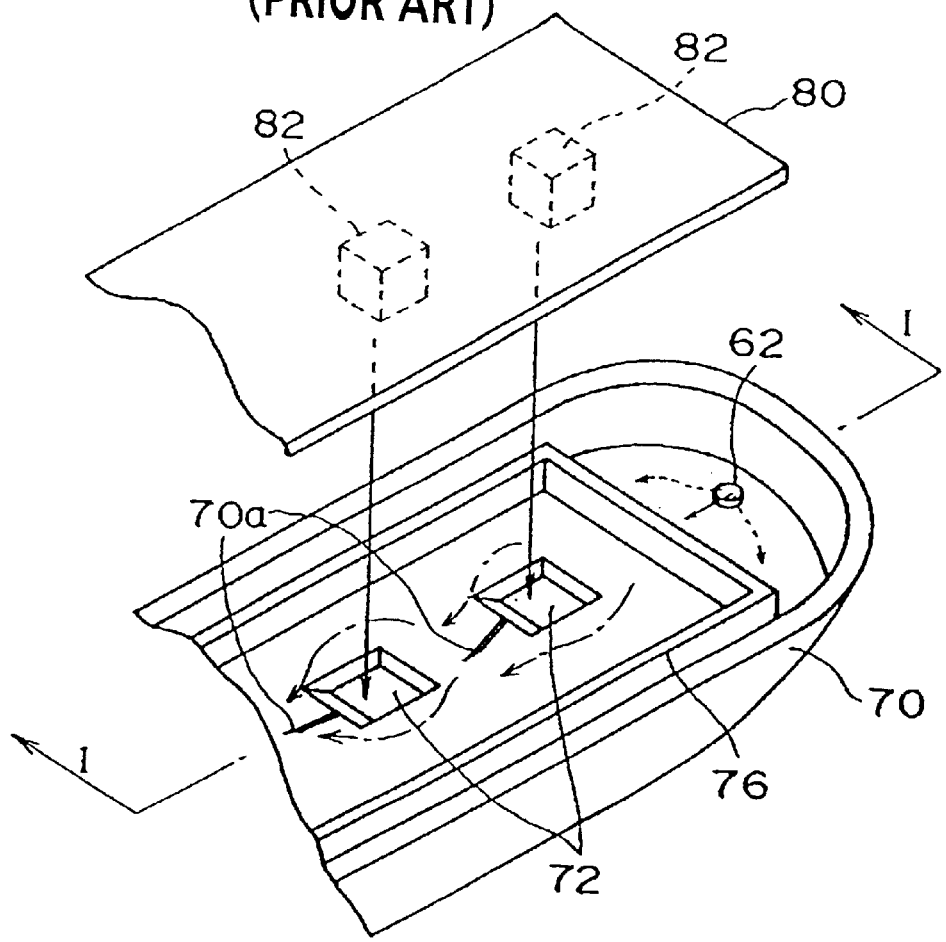
FIG. 12 is a perspective view showing a cellular phone case formed by the injection mold shown in FIG. 11.
Figure 13:
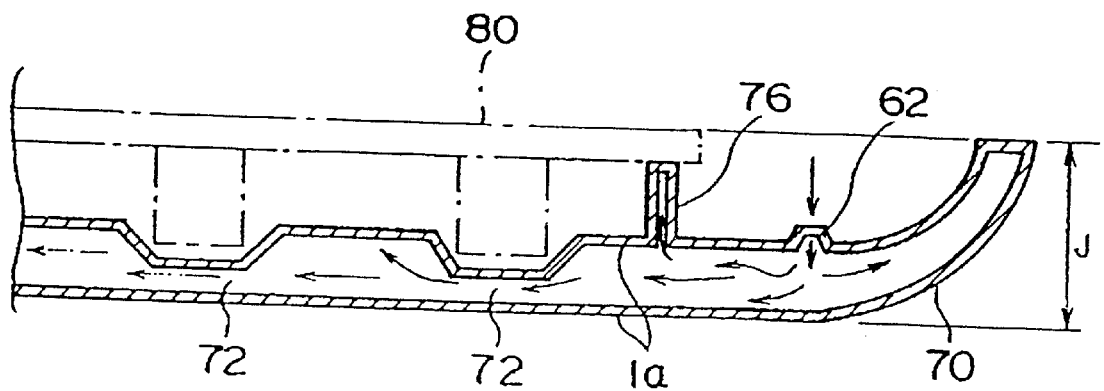
FIG. 13 is a sectional view showing a section taken along line I—I shown in FIG. 12.
Figure 14:
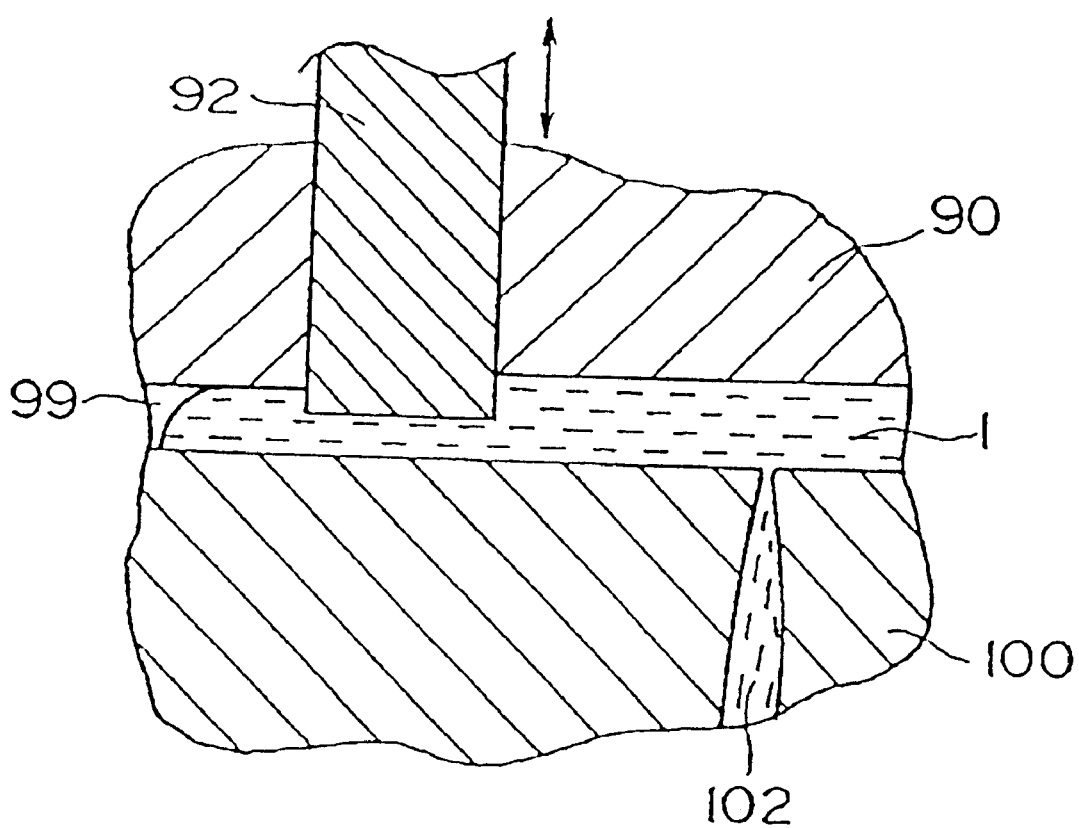
FIG. 14 is a sectional view showing a conventional compression mold.
Figure 15A:
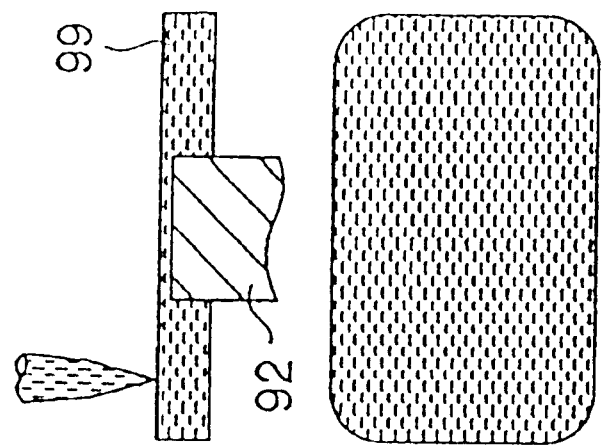
FIGS. 15A, 15B and 15C are operation explanatory views showing the operation of forming a molded material by the compression mold shown in FIG. 14.
Figure 15B:
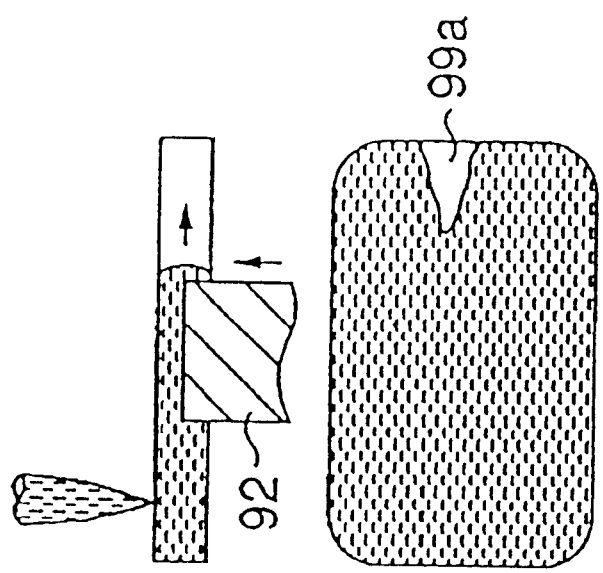
Figure 15C:
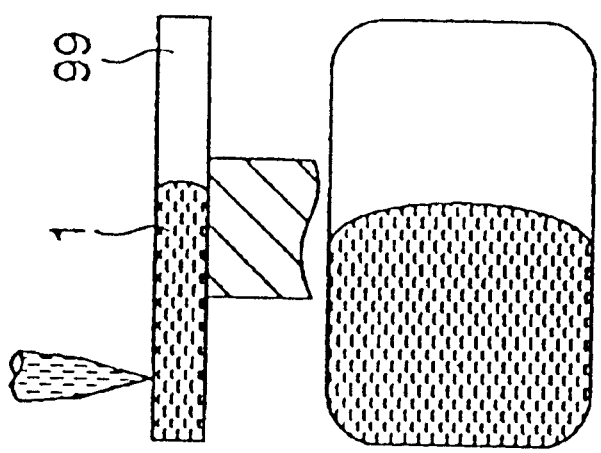
Figure 16:
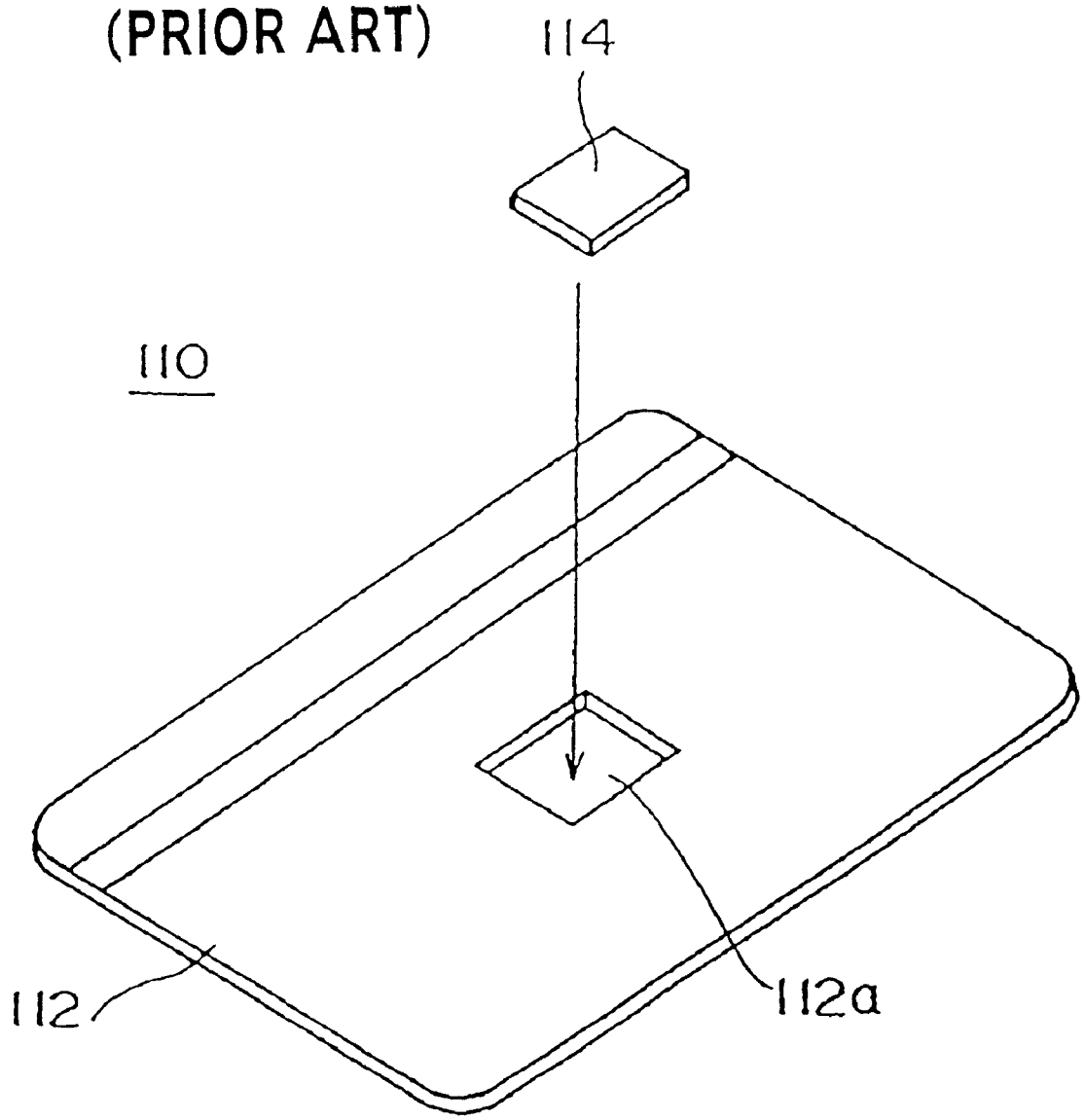
FIG. 16 is a perspective view showing an IC card formed by the compression mold shown in FIG. 14.

Different from the prior art shown in FIG. 12, a conductive member 44 is attached to the top end of the shield wall 36. Moreover, a ground pattern 40a is formed to surround the periphery of the high frequency circuit section on the circuit substrate 40. Therefore, the circuit substrate 40 and the case 30 are sealed/closed via the conductive member 44 attached to the top end of. the shield wall 36, and the conductive member 44 is grounded to the ground pattern 40a of the circuit substrate 40 so that a high shield effect can be obtained.

Moreover, a plurality of (four A to D in FIG. 2) ultra thin portions 32 are compressed by the movable telescopic member 12 shown in FIG. 1 and formed in recess shapes on the case 30 so that when the circuit substrate 40 is attached to the shield wall 36, the electronic components 42 (four in FIG. 2) with large heights can be contained within the shield wall 36. Moreover, ribs 38 formed by the recess portions 10a shown in FIG. 1 are formed around the ultra thin portions 32. Here, the thickness of the ultra thin portion 32 is in a range of 0.1 to 0.25 mm, and the thickness formed around this ultra thin portion 32 is in a range of 0.4 mm to 0.6 mm. Moreover, a gate 22 is disposed on the substantially central portion of a plurality of ultra thin portions 32 on the case 30.

Since the case 30 is provided with the ultra thin portions 32 in this manner, as shown in FIG. 3, an interval G shown in FIG. 3 which is a height from the top surface of the circuit substrate 40 to the bottom surface of the case 30 can be formed to be thin, so that the entire cellular phone case can be thinned.

Here, the ultra thin portion 32 is compressed by the movable telescopic member 12 shown in FIG. 1 and formed in the recess shape as described above. During the compression of the ultra thin portion 32, the resin enters the vent portions 42a of the movable telescopic member 12 shown in FIG. 1 to generate burrs. Therefore, as shown in FIGS. 2 and 3, the case 30 is provided with burr preventive portions 34 when the shield wall 36 with the conductive member 44 laid thereon abuts on the movable telescopic member 12. The burr preventive portion 34 is formed by partially cutting the portion of the tip end of the shield wall 36 which abuts on the movable telescopic member 12.

Therefore, even when a burr 39 is generated as shown in FIG. 4, the conductive member 44 can be attached to the tip end portion of the shield wall 36 without rising up. Therefore, the burr preventive portion 34 is formed to prevent the rising by the burr when the circuit substrate 40, the conductive member 44 and other components are attached to the case 30.

The operation of the multi-point thin portion compression mold of the present invention for forming the cellular phone case 30 will next be described in detail with reference to FIG. 5. When the cellular phone case 30 is formed by the multi-point thin portion compression mold of the present invention, first as shown in FIG. 5A, the movable metal mold 10 is placed in contact with the fixed metal mold 20 to close the molds, and the movable metal mold 10 is pressed onto the fixed metal mold 20 to clamp the molds. In this case, a plurality of movable telescopic members 12 formed on the movable metal mold 10 are disposed not to protrude into the cavity space 9. Subsequently, as shown in FIG. 5A, the cavity space 9 is filled with the molten resin 1 via the gate (see FIG. 2). Here, as shown in FIG. 5A, the recess portion 10a of the movable metal mold 10 and the cavity space 9 other than the shield wall recess portion 10b are filled with the molten resin 1. Specifically, air pocket portions are formed in the recess portion 10a and the shield wall recess portion 10b.

Subsequently, when the cavity space 9 is filled with the molten resin 1, a plurality of movable telescopic members 12 are driven in arrow directions shown in FIG. 5B to start compression. Thereby, as shown in FIG. 5B, the air pocket portions of the recess portion 10a and shield wall recess portion 10b are filled with the molten resin 1 by the compression pressure of the plurality of, movable telescopic members 12, and the inside of the cavity is entirely filled. In this case, although not shown, the movable telescopic member 12 is provided with the vent portion 12a shown in FIG. 1, so that the gas of the air pocket portions can be discharged to the outside.

Figure 6A:
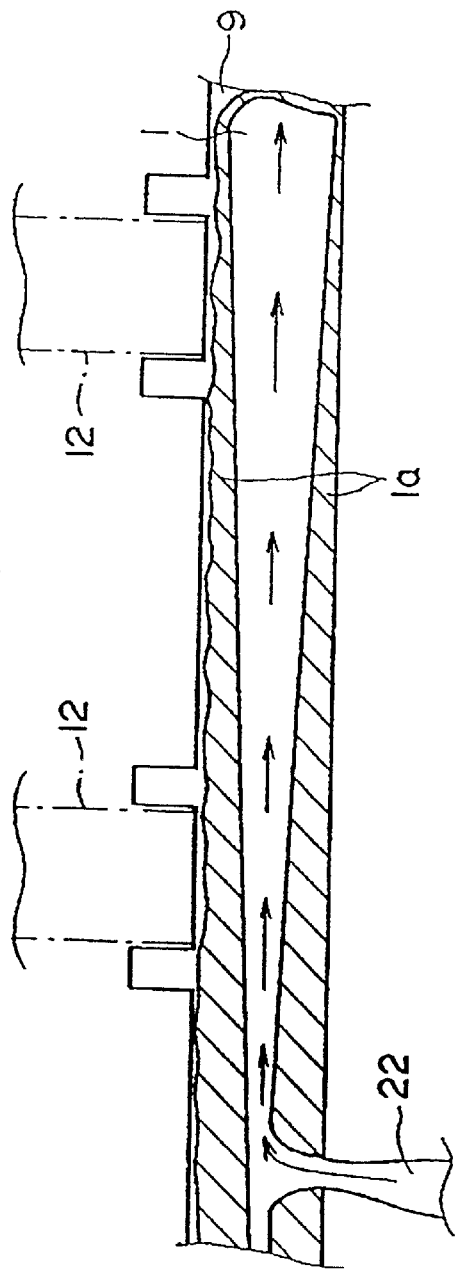
FIGS. 6A and 6B are sectional views showing the state of molten resin with which the metal mold shown in FIG. 5 is filled.
Figure 6B:
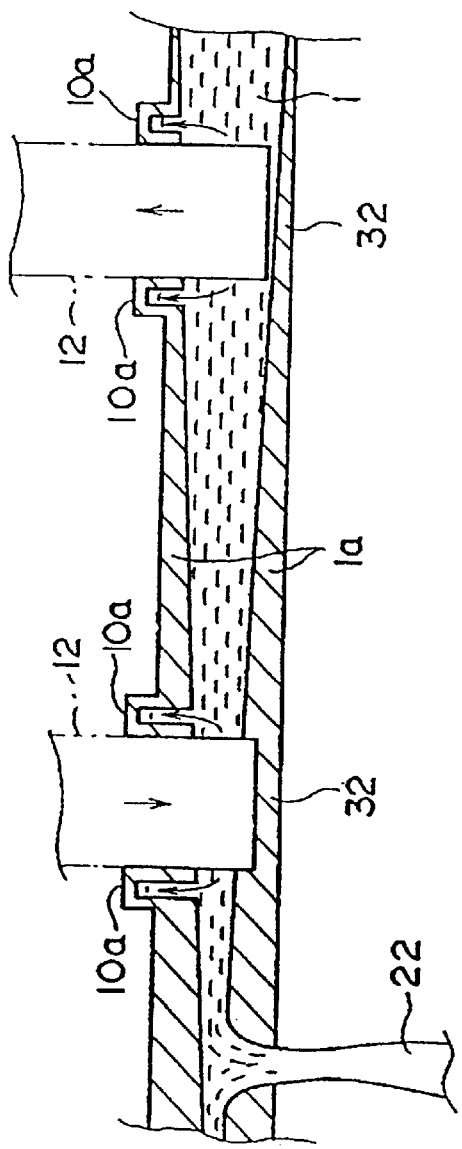
Figure 7:
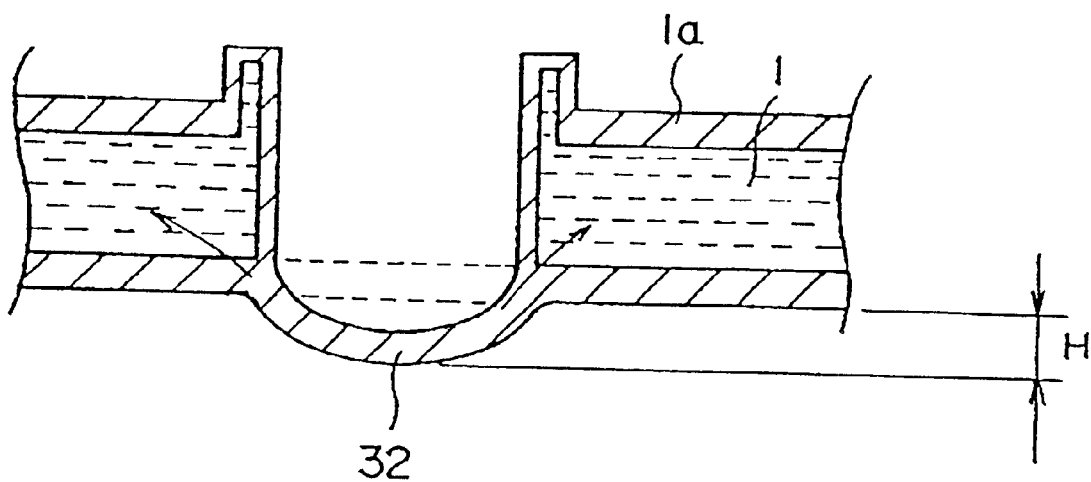
FIG. 7 is a sectional view showing the bulge of an ultra thin portion shown in FIG. 6.

In the multi-point thin portion compression molding method of the present invention, since the movable telescopic member 12 removes the strain generated by the compression applied to the molten resin 1, a plurality of ultra thin portions (A to D shown in FIG. 2) can steadily be formed by allowing the molten resin 1 to escape via the recess portions 10a disposed around the movable metal mold 10. Here, the compressed state of the molten resin 1 by the movable telescopic members 12 in-the metal mold shown in FIG. 5 will be described in detail with reference to FIG. 6. FIG. 6 is a sectional view showing the filled state of the metal mold with the molten resin shown in FIG. 5, FIG. 6A shows the filled state with the molten resin, and FIG. 6B shows the compressed state by the movable telescopic members. Moreover, FIG. 7 is a sectional view showing the bulge of the ultra thin portion shown in FIG. 6.

As shown in FIG. 6A, when the molten resin 1 is supplied to the cavity space 9 via the gate 22, the surface of the resin which abuts on the wall surface of the cavity space is quickly cooled and hardened, and the so-called skin layers 1a are formed. Since the skin layer 1a is formed by first cooling the resin supplied via the gate 22, the layer is formed to be largest in the vicinity of the gate 22. On the other hand, the skin layer 1a is formed to be smaller in the portion positioned far from the gate 22.

Subsequently, as shown in FIG. 6B, when the cavity space is filled with the molten resin 1 and compressed by the movable telescopic members 12, the recess portions 10a are filled with the resin by the compression pressures of the movable telescopic members 12 to form the molded material. In this case, since more skin layers 1a are formed in the vicinity of the gate 22, more molten resin 1 remains around the ultra thin portion 32 positioned far from the gate 22.

When much molten resin 1 remains in this manner, a large strain remains inside the molten resin 1 by the compression pressure of the movable telescopic member 12. Additionally, as shown in FIG. 7, when the residual molten resin 1 is cooled, the volume is contracted, the hardened ultra thin portion 32 is pulled, and the ultra thin portion 32 disadvantageously protrudes and bulges as shown by a distance H shown in FIG. 7. Therefore, for the bulge of the ultra thin portion 22, as shown in FIG. 6B, the ultra thin portion 32 positioned far from the gate 22 with much residual molten resin 1 is found to largely bulge.

A relation between the thickness and bulge of the ultra thin portion 32 (part A shown in FIG. 2) which is positioned far from the gate 22 and largely bulges as described above in the cellular phone case 30 shown in FIG. 2 will next be described in detail with reference to FIGS. 8 and 9. FIG. 8 is a table showing the measured numeric values of the thickness and bulge of the ultra thin portion 32 (part A) positioned far from the gate 22 shown in FIG. 2. Moreover, FIG. 9 is a graph showing the relation between the thickness and the bulge of the table shown in FIG. 8.

In the measurement table of the thickness and bulge shown in FIG. 8, the distance H shown in FIG. 7 is shown as the bulge, and the thickness of the bulged ultra thin portion is shown as the thickness. Moreover, the unit of the numeric value shown in the table is mm. Furthermore, in the table, the thickness and bulge of each of five cellular phone case samples are measured, and average, maximum and minimum values are shown. For the five samples, a plurality of measured values are taken by changing the compression stroke by the movable telescopic member 12 shown in FIG. 6. Specifically, the bulge amount is measured when the compression amount of the movable telescopic member is changed (the thickness of the ultra thin portion is changed). Here, the compression stroke of the movable telescopic member 12 is determined by the press position shown in the table. Although the press position is not shown, the press position corresponds to the adjustment position of the mechanism driven in the metal mold, and is set and measured in a range of 13.6 mm to 17.6 mm in the table. For example, as shown in the table, it is found that the thickness of the ultra thin portion can be formed in 0.247 mm on average by setting the press position to 13.6 mm. It is found in this table that the press position is preferably set to 14.6 mm or less to maintain the average value of the bulge at 0.1 mm or less. Therefore, when the thickness of the ultra thin portion is set to an average value of 0.212 mm, the bulge amount is stabilized at 0.1 mm or less. On the other hand, it is found that when the ultra thin portion becomes as thin as 0.212 mm or less, the bulge amount increases.

Similarly, the relation between the thickness and the bulge will be described in detail with reference to FIG. 9. The graph shown in FIG. 9 shows the bulge amount in the axis of ordinate and the thickness in the axis of abscissa. In this graph, the table shown in FIG. 8 is shown in a curve graph. Therefore, in the same manner as in the table shown in FIG. 8, it is found in the graph shown in FIG. 9 that it is preferable to set the thickness (axis of abscissa) of the ultra thin portion to 0.21 mm or more so that the bulge amount (axis of ordinate) is maintained at 0.1 mm or less. According to the result, in the multipoint thin portion compression mold of the present invention, the press position is set to 13.6 mm to form the cellular phone case shown in FIG. 2. Specifically, this cellular phone case is formed with the thickness of the ultra thin portion of 0.247 mm (about 0.25 mm) on average.

Here, it will be described in detail with reference to FIG. 10 whether the thickness of each of a plurality of ultra thin portions (four A to D shown in FIG. 2) formed on the cellular phone case shown in FIG. 2 is formed to be 0.212 mm or more when the press position is set to 13.6 mm. FIG. 10 is a table showing the measured value of each thickness of a plurality of ultra thin portions shown in FIG. 2 and formed in the press position of 13.6 mm.

In the same manner as in the table shown in FIG. 8, in the table shown in FIG. 10, the thickness and bulge of each of five cellular phone case samples are measured, and the average, maximum and minimum values are shown. Different from the table shown in FIG. 8, the table shows the thickness of four ultra thin portions A to D (corresponding to A to D shown in FIG. 2) in the axis of ordinate. Here, the part A of the ultra thin portion has numeric values similar to those in the press position of 13.6 mm in the table shown in FIG. 8. Moreover, the unit of the numeric value shown in the table is mm.

As shown in FIG. 10, it is seen that for the thickness of the ultra thin portion parts A to D, the average value is 0.212 mm or more. Therefore, in the cellular phone case shown in FIG. 2, the defective phenomena such as bulges, warps, sink marks and burrs can be prevented, and stable production can be realized. As described above, in the multi-point thin portion compression molding method and the multi-point thin portion compression mold for use in this method according to the present invention, the thickness of the case can be formed from the usual thickness (0.8 to 1.5 mm) in the prior art shown in FIGS. 11 to 16 to the thin thickness (0.4 to 0.6 mm), and this thin portion can further be compressed/molded into the ultra thin portion (about 0.25 mm). Therefore, the cellular phone case and other electronic apparatuses can be reduced in thickness and size.

The embodiment of the multi-point thin portion compression molding method and the multi-point thin portion compression mold for use in this method according to the present invention has been described above in detail, but the present invention is not limited to the above-described embodiment, and can be modified in a range not departing from the scope.

For example, the embodiment in which the multi-point thin portion compression molding method and the multi-point thin portion compression mold for use in this method according to the present invention are applied to the cellular phone case has been described, but the present invention is not limited to this embodiment, and can broadly be applied to the other electronic apparatuses which need to be reduced in thickness and size.

According to the multi-point thin portion compression molding method and the multi-point thin portion compression mold for use in this method of the present invention, since the ultra thin portion can partially be formed on the electronic apparatus case, the case can further be thinned and reduced in size, and additionally the case can be lightened.

Moreover, according to the multi-point thin portion compression molding method and the multi-point thin portion compression mold for use in this method of the present invention, since a stable compression molding can be realized by a simple structure in which the recess portions for the ribs are disposed around the metal mold movable telescopic member. the manufacture cost of the metal mold can be reduced, and the electronic apparatus product cost can also be reduced.

What is claimed is:

1. A multi-point thin portion compression molding method comprising the steps of:
    disposing a pair of metal mold apparatuses opened/closed to each other to form a cavity having a molded material shape therebetween when a mold is closed;

disposing at least one movable telescopic member on one opened/closed movable metal mold of the metal mold apparatuses for protruding toward the other fixed metal mold in said cavity by a metal mold mechanism or a separate mechanism;

forming a recess portion for a rib on said movable metal mold for surrounding the periphery or a part of the movable telescopic member;

closing said movable metal mold and the fixed metal mold to fill the cavity other than said recess portion with molten resin;

subsequently allowing said movable telescopic member of said movable metal mold to protrude to compress the molten resin in the cavity; and allowing the molten resin to escape to said recess portion to adjust pressure applied to the inside of the metal mold so that at least one ultra thin portion is formed on a molded material by stable compression, wherein the thickness of the ultra thin portion of said molded material is formed to be a film of ultra thin thickness in a range of 0.1 to 0.25 mm by compression of said movable telescopic member.

2. A multi-point thin portion compression molding method comprising the steps of:

disposing a pair of metal mold apparatuses opened/closed to each other to form a cavity having a molded material shape therebetween when a mold is closed;

disposing at least one movable telescopic member on one opened/closed movable metal mold of the metal mold apparatuses for protruding toward the other fixed metal mold in said cavity by a metal mold mechanism or a separate mechanism;

forming a recess portion for a rib on said movable metal mold for surrounding the periphery or a part of the movable telescopic member;

closing said movable metal mold and the fixed metal mold to fill the cavity other than said recess portion with molten resin;

subsequently allowing said movable telescopic member of said movable metal mold to protrude to compress the molten resin in the cavity; and allowing the molten resin to escape to said recess portion to adjust pressure applied to the inside of the metal mold so that at least one ultra thin portion is formed on a molded material by stable compression, wherein said movable metal mold and the movable telescopic member allows passage of gases by disposing a vent portion having a gap of $15\mu$ to $20\mu$ on both or either one of the center and the periphery of said movable telescopic member.

3. A multi-point thin portion compression molding method comprising the steps of:

disposing a pair of metal mold apparatuses opened/closed to each other to form a cavity having a molded material shape therebetween when a mold is closed;

disposing at least one movable telescopic member on one opened/closed movable metal mold of the metal mold apparatuses for protruding toward the other fixed metal mold in said cavity by a metal mold mechanism or a separate mechanism;

forming a recess portion for a rib on said movable metal mold for surrounding the periphery or part of the movable telescopic member;

closing said movable metal mold and the fixed metal mold to fill the cavity other than said recess portion with molten resin;

subsequently allowing said movable telescopic member of said movable metal mold to protrude to compress the molten resin in the cavity; and allowing the molten resin to escape to said recess portion to adjust pressure applied to the inside of the metal mold so that at least one ultra thin portion is formed on a molded material by stable compression, wherein said recess portion is provided with a burr prevention portion for preventing burrs from being generated by the gap of a vent portion.

* * * * *